US006496496B1

United States Patent
Ramakrishna et al.

(10) Patent No.: US 6,496,496 B1
(45) Date of Patent: Dec. 17, 2002

(54) CRUCIAL CONTROL MESSAGE TRANSMISSION METHOD AND SYSTEMS

(75) Inventors: Deepa Ramakrishna, Plano, TX (US); Ahmad Jalali, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/296,983

(22) Filed: Apr. 22, 1999

(51) Int. Cl.$^7$ ................................................ H04J 13/00
(52) U.S. Cl. ...................... 370/342; 370/331; 370/522; 455/442; 455/522
(58) Field of Search ................................ 370/522, 523, 370/527, 528, 529, 328, 335, 342, 331; 375/140, 146, 225; 455/442, 434, 561, 522

(56) References Cited

U.S. PATENT DOCUMENTS 5,706,428 A * 1/1998 Boer et al. ................ 370/342
6,272,123 B1 * 8/2001 Abe ............................ 370/342

* cited by examiner

Primary Examiner—Lester G. Kincaid
(74) Attorney, Agent, or Firm—Carr Law Firm, L.L.P.

(57) ABSTRACT

Disclosed is an apparatus and method of increasing the likelihood of successful and quick reception of messages containing crucial data in a CDMA cellular communication system. The data may be transmitted at a lower frame rate than normal messages but at the same power level as used for normal messages in full rate frames to raise the signal to noise ratio at the receiver. An abbreviated version of the message containing only the critical parameters may be sent to lessen the likelihood of a bit being incorrectly decoded as well as shortening both the time of transmission and receipt. The two approaches may be combined and the abbreviated message may be supplemental to the normal message. Specifically, the use of a short version of a handoff direction message using only the parameters required for a soft-handoff between cells within a system is described in detail.

8 Claims, 1 Drawing Sheet

| FIELD | LENGTH (IN BITS) |
|---|---|
| MSG_TYPE | 8 |
| ACK_SEQ | 3 |
| MSG_SEQ | 3 |
| ACK_REQ | 1 |
| HDM_SEQ | 2 |

| PILOT_ID | 9 |
|---|---|
| CODE_CHAN | 8 |
| PWR_COMB_IND | 1 |

CRUCIAL CONTROL MESSAGE TRANSMISSION METHOD AND SYSTEMS

TECHNICAL FIELD

The present invention relates in general to a method of and a system for accomplishing the reliable transmission of crucial control messages in CDMA (code division multiple access) communication systems by transmitting these messages at a lower data rate without reducing the transmission power. The increase of the signal to noise ratio of the signal as received by the target device improves the probability of reliable detection without detrimentally altering the interference detected by other receivers in the area

BACKGROUND

In CDMA systems operating in accordance with the industry agreed upon standard known as IS-95, the call drop and access failure rates are low. However, it is always desirable from a customers standpoint that the call drop rate and access failure rate be zero or at least better than it has been.

When a mobile station (MS) is operating in a cellular system, it attempts to keep a presently controlling BTS (base transceiver station), one that the MS is assigned to, informed of the strength of pilot signals received from nearby base stations through the use of a PSMM (pilot strength measurement message). In accordance with parameters internal to a system, the BTS determines which of the pilot signals listed in the PSMM should be added to an active set of pilots in the MSs memory. This is accomplished through the return of an HDM (Handoff Direction Message) or an EHDM (Extended Handoff Direction Message) sent by the BTS to the MS. To reduce call drops observed in present day CDMA systems, it is crucial that when a pilot needs to be added to the active set of an MS, that the HDM/EHDM so instructing reach the MS successfully. Once the MS successfully receives the returned HDM/EHDM, it can then move the pilot to its active set and start demodulating on the additional or recently detected new pilot.

Although the IS-95 standard provides for (allows) the retransmission of the HDM/EHDM message, it may not be successfully received by the MS due to of many factors environmental and/or physical (such as excessive rf interference or buildings). If the MS fails to receive an HDM/EHDM message, a call in progress could be dropped, since the new pilot may be causing too much interference on the forward link.

It has been observed that a significant percentage of call drops occur as a result of the HDM/EHDM not being successfully received by a MS. A message is classified as being unsuccessfully received if the frame(s) that contained the message are received in error. Similarly, access failures occur in part due to the non-successful receipt of a CAM (channel assignment message). While both of these messages are control messages, the HDM/EHDM is, in accordance with IS-95, transmitted over a traffic channel and the CAM is transmitted over a paging channel.

It is believed by many that there is a need for an increased reliability of receipt of these very crucial messages. One method of increasing the reliability of receipt is to increase the power of the transmitted signal. This however has the detrimental effect of increasing the interference as perceived by other MSs in the vicinity of the target MS. Also, the transmit power on the forward traffic channel cannot be increased indefinitely, since there is a system defined upper limit on it.

It would thus be desirable to have a means for transmitting crucial messages in a more reliable manner without detrimentally affecting other nearby MSs.

SUMMARY OF THE INVENTION

The present invention comprises transmitting crucial messages, such as a newly created SHDM (short handoff direction message), in lower rate frames than non-crucial or normal messages while transmitting these crucial messages at the same power level as they would have been transmitted had they been transmitted over full rate frames, to obtain additional processing gain at the receiver.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figures 1, 2A, 2B:
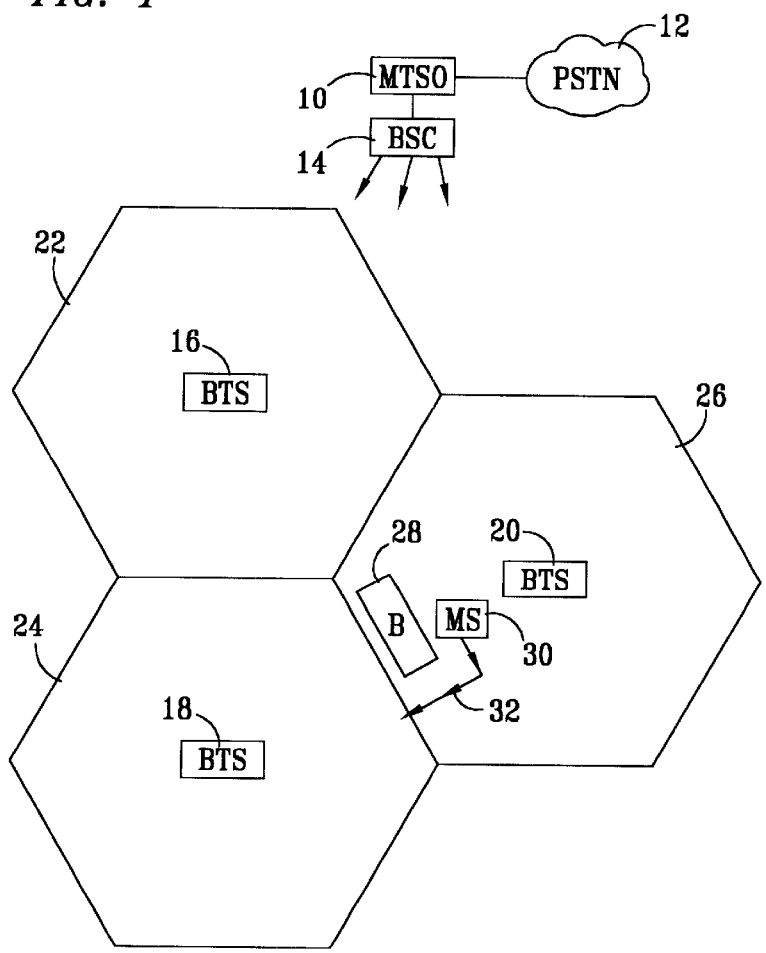
FIG. 1 is a block diagram of a CDMA cellular communication system.
FIGS. 2A and 2B illustrate the contents of a crucial message (SHDM) as detailed in the present invention.

In FIG. 1 an MTSO (mobile telephone switching office) 10 is connected to a cloud designated as PSTN (public switched telephone network) 12 and to a BSC (base station controller) 14. Typically a BSC is connected to a plurality of base transceiver stations (BTS) although a cellular system may include just one BTS. As shown, a plurality of BTS cell sites are represented by BTS blocks 16, 18 and 20. Each BTS block is enclosed by a hexagon block used to present an area around the BTS within which an MS (mobile station) and a BTS may be expected to reliably communicate. Thus BTS 16 lies within a hexagon 22, BTS 18 lies within a hexagon 24 and the BTS 20 lies within a hexagon 26. Also shown within block 26 is a building 28 and an MS 30. MS 30 is illustrated as being physically between BTS 20 and the building 28 and located such that it may receive pilot signals from BTS 20 and BTS 16. For the purposes of this description, it may be assumed that MS 30 was recently turned to an ON condition and is in communication with another user through BTS 20. Due to the blockage of signals from building 28, MS 30 does not detect a pilot from BTS 18.

It may be further assumed that MS 30 is being moved in the direction of an arrow indicator 32 such that it suddenly detects the existence of a pilot transmitted by BTS 18 as it changes direction of movement and moves in the direction of BTS 18 and soon thereafter into the area defined by hexagon 24.

If the strength of the pilot signal from BTS 18 exceeds T_ADD, which is an add threshold for addition of the corresponding BTS to the active set, the MS 30 will send a PSMM (pilot strength measurement message) over the traffic channel back to the BTS 20 indicating the newly found pilot signal. In accordance with some relative pilot strength algorithm internal the system, an HDM/EHDM will be transmitted by BTS 18 to MS 30 ordering the MS to add BTS 18 to its active set and to start demodulating its traffic channel. It may be ascertained that, as the MS 30 moves toward BTS 18, MS 30 starts to get in the shadow of building 28 as concerns control signals from BTS 20. The HDM/EHDM message in such a case may very well not be successfully received by MS 30 because the pilot from BTS 18 is so strong that it is too much of an interferer relative the strength of the HDM/EHDM signal. The situation described above is commonly referred to as a slow handoff problem and is usually caused by a pilot that rises in strength very rapidly. It has been determined in field experiments that 25% of all call drops are caused due to slow handoff. Slowly rising pilots do not pose a problem as they are seen by the MS and added into the active pilot set well before they become very strong and a handoff is requested. It may be noted that the example described above is merely an illustration of one possible scenario where slow handoff could be observed.

If the HDM/EHDM message were sent at a lower frame rate while using the same power level as full rate frames, the signal to noise ratio (SNR) will be increased at a given receiving device. Given that the transmission power remains the same, the SNR is then inversely proportional to the data rate of the transmission. Hence, if the frame rate were reduced by a factor of two, the (SNR) would be increased by at least 3 db (decibels). If the frame rate were reduced to ¼that of normal control messages, the (SNR) would be increased by at least 6 db. Thus, for a given transmission power level, the lower the data rate, the more likely it is to be successfully received.

With the above in mind, a part of the present invention is the transmission of crucial messages at a lower frame data rate than normal or non-crucial messages but at the same power level as normal messages in full rate frames would have been transmitted.

It should also be noted that a short message (a small number of data bits) occupying a smaller number of frames is more likely to be successfully received than is a longer message occupying a larger number of frames. In other words, the more bits that are transmitted, the more likely it is that at least one of the bits received will be incorrectly decoded, causing a frame error. For ¼rate frames, as per the standard, each data bit is repeated 4 times, then convolutionally coded and the bit stream is then interleaved. This interleaving provides added gain for quarter rate frames, as opposed to full rate frames, especially at higher speeds when the fade durations are not very long. The gain due to the interleaving alone can be as much as 2 dB.

An HDM/EHDM is a control message that is transmitted, as a substitution for one frame of user supplied voice or data information, over a traffic channel while a voice conversation is in progress. The action of blanking out the voice data in order to transmit a control message is referred to as "blank and burst". Each occurrence of a control message thus may cause a degradation of the quality of the received audio signal. While an occasional control message, which results in a blank out of the voice data is barely perceptible to the human ear, if several consecutive frames were used for a control message, the resulting audio distortion might be unacceptable to the customer.

An HDM/EHDM, as set forth in IS-95, has more than 22 fields, and occupies one or more full rate frames. If this message were sent at a lower frame rate, such as ¼the normal rate, to increase the SNR at the receiving MS, not only would it be likely that voice traffic quality would suffer, from having 4 consecutive frames blanked, but it is also likely that at least one of the multiple frames required to transmit the HDM/EHDM would not be successfully received.

The fields or parameters of HDM/EHDM as set forth in IS-95 can be split into three groups. A first group comprises the specifications for forward traffic channels assigned to the mobile station including pilot PN sequence offset index, a code channel index and a power control symbol combining indicator. These three parameters of the first group are set forth in FIG. 2B. A second group of parameters govern the transmission of future PSMMs and a third group of parameters pertain specifically to CDMA to CDMA hard handoffs. In addition to the above mentioned parameters there are required fields in the HDM/EHDM message. Four of these required fields are listed in FIG. 2A and are MSG_TYPE, ACK_SEQ, MSG_SEQ, and ACK_REQ.

It will be apparent from an examination of the parameters in the second and third groups that transmission of this information can be delayed until after a soft handoff between CDMA cells is completed. In other words, the parameters of the first group may be considered more "urgent" to successfully accomplish a soft handoff than the parameters in the second and third groups. With appropriate adjustment of the size of the required fields, the number of data bits required to transmit the parameters of the first group can be reduced to less than ¼the number of data bits in an HDM/EHDM frame.

It is therefore another part of this invention to create a new handoff direction message designated herein as SHDM (short handoff direction message). Such a handoff direction message may be used to inform the MS to perform a handoff while still using the IS-95 HDM/EHDM message at other times. When this SHDM is transmitted at a ¼frame rate while using the same power as would be used for an HDM/EHDM, the likelihood of successful reception is greatly enhanced.

This same approach may be used for other critical messages such as the channel assignment message. Since the channel assignment message is transmitted on a control channel (paging), it could be transmitted at a ¼frame rate without interfering with user traffic and at the power level of other non-critical control messages to increase the likelihood of successful reception.

In summary, this invention comprises modifying existing IS-95 standards to allow the transmission of crucial or critical control messages at a lower frame rate while the transmission power is kept at the same level as would be used for normal control messages. A further modification comprises the addition of a new handoff direction message (SHDM ) that, because of the decreased number of bits and the time within which the bits are transmitted, is not only more likely to be received successfully but additionally the entire transmission of the message will be completed more quickly. Thus the MS is less likely to be involved in a call drop in passing from one cell to another.

Although the invention has been described with reference to a specific embodiment, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method of increasing the likelihood of successfully transmitting and receiving a critical message between a BTS (base transmission station) and an MS (mobile station) in a CDMA (code division multiple access) communication system comprising the steps of:

formatting a critical message to have fewer total bits of information than a normal message contains, wherein the critical message is an abbreviated handoff direction message; and transmitting the critical message at the same power level as a normal message would be transmitted.

2. A method of increasing the SNR (signal to noise ratio) of control messages deemed critical in a CDMA (code division multiple access) communication system comprising the steps of:

formatting a critical message to conform to a 3 frame rate as compared to non-critical messages, wherein the critical message is an abbreviated handoff direction message and comprises some of the parameters of a normal handoff direction message; and transmitting the critical message at the same power level as a normal message would be transmitted.

3. A cellular CDMA (code division multiple access) communication system comprising:

an MTSO (mobile telephone switching office) connected to a plurality of BTS (base transceiver stations); and circuitry for transmitting critical messages to an MS (mobile station) at a lower frame rate than non-critical messages in full rate frames, but at the same power level that the non-critical messages are transmitted, wherein at least one of the critical messages is an abbreviated form of a handoff direction message.

4. A cellular CDMA (code division multiple access) communication system comprising:

an MTSO (mobile telephone switching office) connected to a plurality of BTS (base transceiver stations); and circuitry for transmitting critical messages to an MS (mobile station) at a lower frame rate than non-critical messages in full rate frames, but at the same power level that non-critical messages are transmitted, wherein at least one of the critical messages transmitted is supplemental to at least one of the non-critical messages and duplicates some of the parameters of the non-critical messages.

5. A cellular CDMA (code division multiple access) communications system comprising:

an MTSO (mobile telephone switching office) connected to a plurality of BTS (base transceiver stations);

at least one MS (mobile station) moving from one cell of the system to another; and circuitry for transmitting an abbreviated version of critical messages between said BTS and said MS at the same power level that non-critical messages are transmitted, the abbreviated version of a critical message being supplemental to the normally transmitted message and duplicating some of the parameters of that message.

6. A method of increasing the likelihood of successfully transmitting and receiving a critical parameter of a message between a BTS (base transmission station) and an MS (mobile station) in a CDMA (code division multiple access) communication system comprising the steps of:

formatting an abbreviated version of a critical message to have fewer total bits of information than a normally transmitted version of that message, wherein the abbreviated version of a critical message supplements the normally transmitted version of that message and does not replace it; and transmitting the abbreviated version of a critical message at the same power level as a normal message would be transmitted.

7. A method of increasing the likelihood of successfully transmitting and receiving a critical parameter of a message between a BTS (base transmission station) and an MS (mobile station) in a CDMA (code division multiple access) communication system comprising the steps of:

formatting an abbreviated version of a critical message to have fewer total bits of information than a normally transmitted version of that message, wherein the critical message is a handoff direction message; and transmitting the abbreviated version of a critical message at the same power level as a normal message would be transmitted.

8. A method of decreasing the FER (frame error rate) of control messages deemed critical in a CDMA (code division multiple access) communication system comprising the steps of:

formatting a critical message to conform to a lower frame rate as compared to non-critical messages, wherein the critical message is a handoff direction message; and transmitting the critical message at the same power level as a normal message would be transmitted.

* * * * *